No. 836,345. PATENTED NOV. 20, 1906.
M. L. SENDERLING.
VEHICLE SPRING.
APPLICATION FILED APR. 1, 1904.
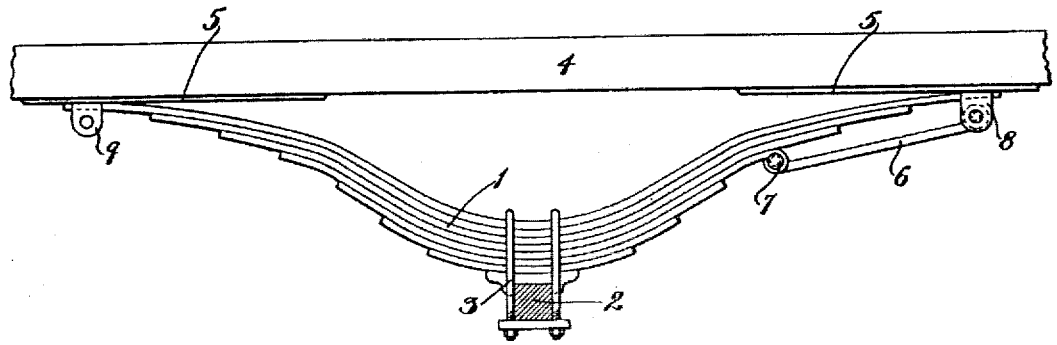
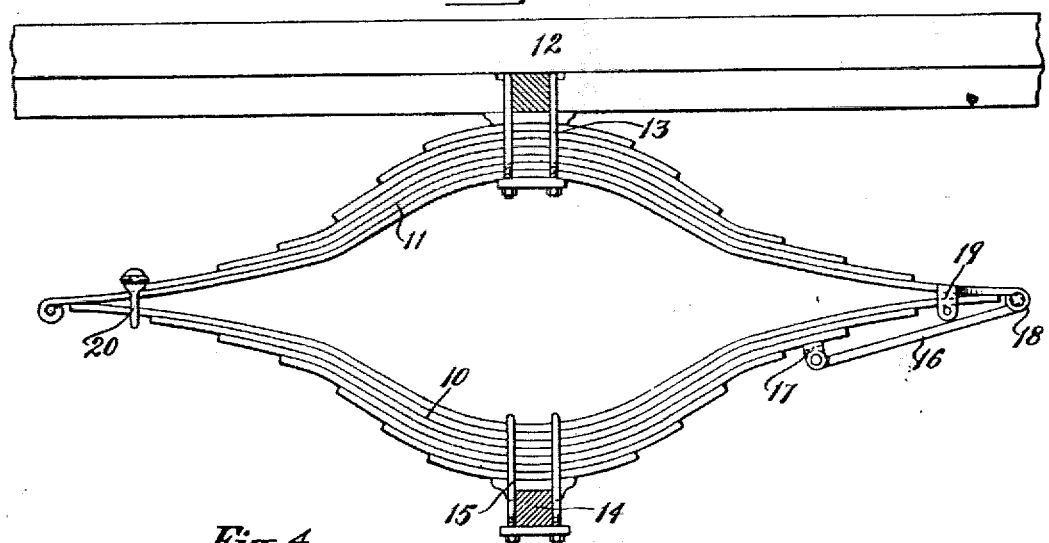
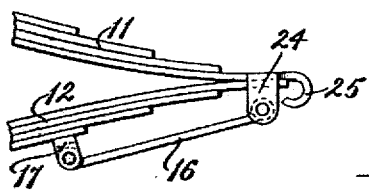
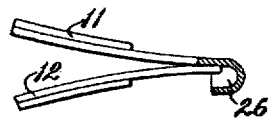
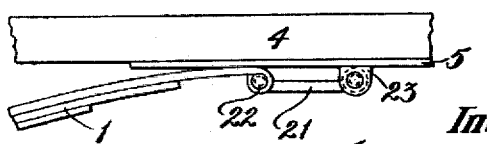
Witnesses:
F. G. Hackenberg
Henry Thieriot
Inventor:
Martin L. Senderling
by attorneys
Brown & Seward

UNITED STATES PATENT OFFICE.

MARTIN L. SENDERLING, OF JERSEY CITY, NEW JERSEY.

VEHICLE-SPRING.

No. 836,345.  Specification of Letters Patent.  Patented Nov. 20, 1906.

Application filed April 1, 1904. Serial No. 201,134.

*To all whom it may concern:*

Be it known that I, MARTIN L. SENDERLING, a citizen of the United States, and a resident of Jersey City, in the county of Hudson and State of New Jersey, have invented a new and useful Improvement in Vehicle-Springs, of which the following is a specification.

My invention relates to an improvement in vehicle-springs; and it consists in a vehicle-spring which is so arranged that its load-bearing points will automatically adjust themselves differentially to the weight of the load—*i. e.*, relative to its leverage—to points within its primary supporting-points independently of the shifting of its supporting-points, due to the longitudinal extension or expansion of the spring, thus insuring the maximum power of support to the minimum of compression in a given spring, and thereby preventing overaction and insuring a less jolt to the load carried by the spring.

Practical embodiments of my invention are represented in the accompanying drawings, in which—

Figure 1 represents in side elevation so much of a vehicle as illustrates my improved spring and its adjacent parts when applied to a semi-elliptic spring. Fig. 2 is a similar view showing the invention applied to a full-elliptic spring. Fig. 3 is a detail view showing another way of connecting one end of the spring to the part which it supports. Fig. 4 is a detail view showing a modified form of connection between the upper and lower members of a full-elliptic spring, and Fig. 5 is a detail view showing another form of connection between the upper and lower members of a full-elliptic spring.

The semi-elliptic spring (represented in Fig. 1) is denoted by 1 and is shown as composed of a plurality of leaves gradually shortening from the top leaf to the bottom leaf. This spring is secured to its support 2 by the usual clip 3, which support may be the axle of a vehicle. The part which is carried by the spring is denoted by 4 and may be any portion of a vehicle-body. This part 4 may be provided with wearing-plates 5 where the part rests upon the top leaf of the spring 1. It is also to be understood that the top leaf may be provided with a hardened wearing-surface, if so desired. A swinging retaining-link 6 is employed to couple the spring to the part which it supports. In this form one end of the link is hinged in an eye 7, formed by one of the intermediate leaves of the spring 1, and the other end of the link is hinged in a depending keeper 8, carried by the part 4, which keeper embraces the sides of the top leaf of the spring for holding the spring against lateral movement. The other end of the spring is also held against lateral movement by a keeper 9, which depends from the part 4.

In Fig. 2 I have represented a full-elliptic spring, the lower member being denoted by 10 and the upper member by 11. The upper member of the spring is formed of a number of leaves gradually shortening in length from the bottom to the top and is secured to the part 12, which it supports, by a suitable clip 13. The lower member is also composed of a number of leaves gradually shortening in length from the top to the bottom and is secured to its support 14 by a clip 15, which support may be the axle of the vehicle. A swinging retaining-link 16 is hinged at one end to an ear 17, carried by one of the intermediate leaves of the member 10 of the spring, and the outer end of the link is hinged in an eye 18, formed by bending over the end of the bottom leaf of the member 11 of the spring.

In Fig. 3 I have shown the swinging retaining-link 21 for coupling the semi-elliptic spring to the part which it supports as being hinged at one end to an eye 22, formed by bending over the end of the top leaf of the spring, and hinged at its other end to a lug 23, depending from the part 4.

In Fig. 4 I have shown the swinging retaining-link 16 hinged at one end to the ear 17 and at its other end to a keeper 24, depending from the upper spring member 11, which keeper also serves to hold the two spring members against lateral movement with respect to each other. In this form I have shown the bottom leaf of the upper spring member 11 bent over to form an end protector 25 to the top leaf of the lower spring members.

In Fig. 5 I have shown a housing 26, carried by the bottom leaf of the upper spring member 11, within which housing the top leaf of the lower spring member 10 is located, the housing serving as a keeper to hold the two members against lateral displacement.

In the accompanying drawings I have shown the outer portions of the springs as bent at a slight angle to the inner portions of the springs, so that the weight of the load will gradually travel inwardly from the primary supporting-point until the weight of the load rests upon a predetermined point on the spring, and from this point of the spring the weight of the load will travel much more slowly.

It will be seen that the longitudinal action of the spring, due to its rapidly-shifting points of bearing, counteracts largely by its indirection the vertical thrust of the spring and rapidly tends to the equilibrium of the latter and inverse to the recoil of the spring. This rapidly-reducing leverage operates to reduce the force of the thrust exerted by the load upon a given point of the spring and lessens the effect upon its consequent ultimate power or capacity both as to compression and as to recoil than if the thrust was exerted by the load upon a point of the spring acting as a lever upon said point as a fulcrum.

It will be seen that a common form of spring cannot accomplish the results which this invention accomplishes, for as the common form of spring compresses it also expands or extends, and thus increases the leverage instead of decreasing it.

What I claim is—

1. A vehicle-spring, a support therefor, a part supported by the spring, said spring providing a close contact of its face with said part, against which part it has a longitudinally-shifting contact between its primary bearing-points, and a swinging retaining-link secured to the said spring and to the said part supported by the spring.

2. A vehicle-spring, a support therefor, a part supported by the spring, said spring providing a close contact of its face with said part, against which part it has a longitudinally-shifting contact between its primary bearing-points, and a swinging retaining-link secured to said spring at a distance from its support and also to the said part supported by the spring.

3. A full-elliptic spring, a support for the lower member, a part supported by the upper member, the two members having a close contact of their faces and arranged to shift their points of contact within the primary supporting-point and a link connecting the two members.

In testimony that I claim the foregoing as my invention I have signed my name, in presence of two witnesses, this 30th day of March, 1904.

MARTIN L. SENDERLING.

Witnesses:
FREDK. HAYNES,
HENRY THIEME.